United States Patent
Brandenburger et al.

(10) Patent No.: US 10,456,328 B2
(45) Date of Patent: Oct. 29, 2019

(54) AMPOULE FOR MEDICAL LIQUID AND METHOD FOR PRODUCING AN AMPOULE

(71) Applicant: Fresenius Kabi Deutschland GmbH, Bad Homburg (DE)

(72) Inventors: Torsten Brandenburger, Reichelsheim (DE); Ismael Rahimy, Friedberg (DE); Christian Ebert, Frankfurt (DE)

(73) Assignee: Fresenius Kabi Deutschland GmbH, Bad Homburg (DE)

( * ) Notice: Subject to any disclaimer, the term of this patent is extended or adjusted under 35 U.S.C. 154(b) by 691 days.

(21) Appl. No.: 15/021,006

(22) PCT Filed: Sep. 12, 2014

(86) PCT No.: PCT/EP2014/069492
§ 371 (c)(1),
(2) Date: Mar. 10, 2016

(87) PCT Pub. No.: WO2015/036536
PCT Pub. Date: Mar. 19, 2015

(65) Prior Publication Data
US 2016/0220444 A1    Aug. 4, 2016

(30) Foreign Application Priority Data

Sep. 12, 2013 (EP) .................................... 13184147

(51) Int. Cl.
*A61J 1/06*     (2006.01)
*B65D 1/02*    (2006.01)
(Continued)

(52) U.S. Cl.
CPC .............. *A61J 1/065* (2013.01); *A61J 1/067* (2013.01); *A61J 1/14* (2013.01); *A61J 1/18* (2013.01);
(Continued)

(58) Field of Classification Search
CPC .... A61J 1/065; A61J 1/067; A61J 1/14; A61J 1/18; A61J 2205/30; B29C 49/0073; B29C 49/46; B65D 1/0238; B65D 1/095
See application file for complete search history.

(56) References Cited

U.S. PATENT DOCUMENTS

| 4,178,976 A | * | 12/1979 | Weiler ...................... A61J 1/05 |
| | | | 215/377 |
| 5,409,125 A | * | 4/1995 | Kimber ................... A61J 1/067 |
| | | | 215/48 |

(Continued)

FOREIGN PATENT DOCUMENTS

| EP | 0 228 751 | 7/1987 |
| WO | 2008/081274 | 7/2008 |
| WO | 2009/019527 | 2/2009 |

*Primary Examiner* — Philip R Wiest
(74) *Attorney, Agent, or Firm* — Occhiuti & Rohlicek LLP (57) ABSTRACT

An ampoule for a medical liquid comprises an ampoule body for accommodating a medical liquid and a connection part for connecting a removal device to the ampoule, which connection part extends in a longitudinal extension direction and adjoins the ampoule body. The connection part and the ampoule body are formed as one piece and the connection part has a threaded segment having at least two thread turns arranged thereon, which are axially offset from each other in the longitudinal extension direction. The ampoule enables simple attachment of a removal device, creates a tight transition between a connection part and the removal device, is simple and economical to produce, and can provide a defined attachment state for the removal device on the ampoule.

13 Claims, 8 Drawing Sheets

(51) Int. Cl.
   *B65D 1/09* (2006.01)
   *A61J 1/18* (2006.01)
   *B29C 49/00* (2006.01)
   *B29C 49/46* (2006.01)
   *A61J 1/14* (2006.01)

(52) U.S. Cl.
   CPC .......... *B29C 49/0073* (2013.01); *B29C 49/46* (2013.01); *B65D 1/0238* (2013.01); *B65D 1/095* (2013.01); *A61J 2205/30* (2013.01); *B29B 2911/1442* (2013.01); *B29C 2049/4664* (2013.01)

(56) References Cited

U.S. PATENT DOCUMENTS

| | | | | |
|---|---|---|---|---|
| 5,901,865 | A * | 5/1999 | Weiler | B65D 23/003 |
| | | | | 215/46 |
| 7,056,308 | B2 * | 6/2006 | Utterberg | A61M 39/02 |
| | | | | 604/256 |
| 2006/0163109 | A1 | 7/2006 | Hansen | |
| 2011/0031157 | A1 * | 2/2011 | Nakano | A61J 1/067 |
| | | | | 206/532 |
| 2016/0200484 | A1 * | 7/2016 | Cosman | A61J 1/067 |
| | | | | 215/45 |

\* cited by examiner

AMPOULE FOR MEDICAL LIQUID AND METHOD FOR PRODUCING AN AMPOULE

CROSS REFERENCE TO RELATED APPLICATIONS

This application is a National Stage of International Application No. PCT/EP2014/069492 filed on Sep. 12, 2014, which claims priority to European Application No. 13184147.0 filed on Sep. 12, 2013, the contents of which are hereby incorporated by reference in their entirety.

The invention relates to an ampoule for medical liquid according to the preamble of claim 1, to an ampoule arrangement and to a combination of an ampoule and a removal device.

An ampoule of this type includes an ampoule body for receiving medical liquid and a connection part, which extends along a longitudinal extension direction and connects to the ampoule body, for connecting a removal device, preferably a syringe, to the ampoule.

Such ampoules serve for preserving, preparing and/or transporting medical liquids and are obtainable in different sizes, for example with a volume of between 5 ml and 30 ml. A medical liquid contained in such an ampoule can be, for example, a medical substance, for example a drug or another liquid which is used for medical purposes. The medical liquid can be removed out of the ampoule, for example to administer an infusion or an injection or for clinical nutrition or for another intended application, in order to be administered to the patient.

Conventional ampoules are produced by means of the so-called blow/fill/seal method (BFS). The blow/fill/seal method is a method which is used especially for producing receptacles for receiving liquids. During the blow/fill/seal method, a receptacle is formed, filled and sealed in one uninterrupted process in a sealed environment inside a machine without the intervention of an operator being required for this purpose. Within the framework of the blow/fill/seal method, as a rule a plastics material is vertically extruded in order to produce a tubular portion which is then formed, filled and subsequently sealed in one mold. On account of the forming of the receptacle, in particular in a sterile environment, the blow/fill/seal method is suitable in particular for producing ampoules for receiving medical liquids.

Ampoules of this type are disclosed, for example, in U.S. Pat. No. 4,671,763 and in WO 2011/075798 A1.

Ampoules of this type are, as described in U.S. Pat. No. 4,671,763 and WO 2011/075798, conventionally sealed by a break-off part which, in an initial state with the ampoule not opened, is connected to a connection part of an ampoule body. For opening the ampoule and for removing the medical liquid contained therein, the break-off part can be broken off such that a suitable removal device, for example, a syringe, is able to be fitted onto the connection part of the ampoule and medical liquid contained in the ampoule is able to be removed thereby. For example, a syringe cone of a syringe is inserted into an opening of the connection part for this purpose in order to remove the medical liquid out of the interior of the ampoule by means of the syringe cone.

There is a need for ampoules which enable simple fitting of a removal device onto a connection part with as sealed as possible a transition between the removal device and the ampoule and which are able to provide a defined fitting state.

It is the object of the present invention to provide an ampoule which enables simple fitting of a removal device, at the same time creates a sealed transition between a connection part and the removal device, is simple and cost-efficient to produce and is able to provide a defined fitting state for the removal device on the ampoule.

Said object is achieved by the subject matter with the features of claim 1. The invention is described by an ampoule for medical liquid, said ampoule being produced by means of the blow/fill/seal method, having an ampoule body for receiving medical liquid, a connection part which extends along a longitudinal extension direction and connects to the ampoule body for the sealing connection of a removal device with a Luer cone to the ampoule and a break-off part which is realized integrally with the connection part and is connected to the connection part by means of a predetermined breaking point. The connection part is formed integrally with the ampoule body and comprises a threaded portion with at least two threads arranged thereon which are offset axially with respect to one another along the longitudinal extension direction.

The invention can also be described in a general manner by an ampoule for medical liquid, having an ampoule body for receiving medical liquid and a connection part which extends along a longitudinal extension direction and connects to the ampoule body for connecting a removal device to the ampoule, wherein the connection part is formed integrally with the ampoule body and comprises a threaded portion with at least two threads arranged thereon which are offset axially with respect to one another along the longitudinal direction.

The connection part, therefore, is formed integrally with the ampoule body and comprises a threaded portion with at least two threads arranged thereon which are offset axially with respect to one another along the longitudinal direction.

The present invention proceeds from the idea of providing a so-called Luer lock connection integrally with the ampoule body on the connection part, by means of which Luer lock connection a removal device is able to be connected to the ampoule. As a result of two (or more) threads being integrally molded onto the connection part of the ampoule, it is possible to provide a defined stop which, when producing a Luer lock connection to an associated removal device, for example a syringe, defines a fitting state, in which the removal device is fitted in a defined manner onto the connection part and, for example, a male Luer lock connection of the removal device is screw-connected in a defined manner completely onto the connection part which provides the, here, female Luer lock connection of the removal device.

A Luer lock is to be understood as a standard connecting system for connections in the medical area. It can be used, among other things, for connecting cannulas, syringes, catheters, three-way valves or infusion lines. In this connection, a seal is produced by means of a so-called Luer cone on a connection part (which is also designated as a male connection part) which is able to be inserted into an associated inner cone on another connection part (also designated as a female connection part) and in the inserted state produces a sealing transition between the connection parts. The one connection part additionally comprises a union nut which is able to be screw-connected onto a thread of the other connection part by means of, for example, a half-turn in order to produce a fixed, but releasable connection between the connection parts in the screw-connected state.

In the case of the ampoule proposed here, the connection part of the ampoule realizes a (female) connection part of the Luer lock connection, whilst the removal device provides another (male) connection part. A union nut of the removal device can be screw-connected onto the threaded portion of the connection part which preferably comprises two threads such that, in the screw-connected state, a fixed connection between the ampoule and the removal device is created where as a result of inserting the Luer cone (on the removal device) into the inner cone (of the connection part), a sealing transition is created between the ampoule and the removal device.

As a result of the connection part with its threaded portion being integrally formed with the ampoule body, production is simple and cost-efficient. As a result of providing at least two threads arranged on the threaded portion of the connection part, there is an advantageous connection between the connection part and an associated union nut of the removal device. In particular, there is a defined fitting state when the union nut is completely screw-connected, which enables simple, error-free handling for a user.

The ampoule body and the connection part that is formed integrally thereon is produced in an advantageous manner by means of the blow/fill/seal method. Within the framework of the blow/fill/seal method, which as a rule runs with several steps, a plastics material is extruded when heated in order to create a tube. Said extruded tube is inserted into a two-part mold and cropped. In a preferably sterile environment, said extruded tube is then blown by means of a suitable filling needle in order to form the ampoule body and the container is then filled with (medical) liquid and sealed by means of a suitable forming tool. Because all the steps are able to run inside a sterile environment and in particular the filling and sealing of the ampoule are effected in a protected manner, a process is produced which enables pharmaceutical liquids to be filled into ampoules in a sturdy, simple and reliable manner.

The ampoule with its ampoule body and its connection part can be produced, for example, from polyethylene (PE) or polypropylene (PP).

Each thread preferably comprises two thread portions which are arranged on diametrically opposite sides of the threaded portion. Each thread is consequently composed of two individual thread portions. A first thread portion extends on a first side of the threaded portion, whilst a second thread portion extends on an oppositely situated side (with reference to the longitudinal extension direction of the connection part) of the threaded portion and continues the first thread for providing a circumferential thread. Consequently, there are two threads which are each composed of two thread portions such that a total of four thread portions are arranged on the threaded portion of the connection part.

The ampoule preferably further comprises a break-off or twist-off part which, in an initial state with the ampoule sealed, is realized integrally with the connection part and is connected to the connection part by means of a predetermined breaking point. The break-off part can be removed from the connection part in a simple manner as a result of breaking-off or twisting-off and in the initial state seals an opening of the connection part, by means of which, with the ampoule open, the medical liquid contained in the ampoule body is able to be removed. The predetermined breaking point can be formed, for example, by a notch extending around between the connection part and the break-off part or by a reduction in the wall thickness. In a preferred development, the predetermined breaking point is provided exclusively by means of a ring predetermined breaking point which extends over the circumference of the opening in the connection part. In particular prior to breaking-off or twisting off, the break-off or twist-off part is fastened to the connection part or to the ampoule body exclusively by means of said ring predetermined breaking point.

The break-off part preferably carries an identification which can be realized as an opening in the break-off part or as an embossing which protrudes from, is raised from or is recessed in a basic body of the break-off part. By means of the identification, which can comprise the form of an arrow, for example, a so-called authenticity symbol can be provided which indicates to the user that the break-off part connected to the connection part is an original part and the sealed ampoule is consequently in its original initial state, that is to say has not been opened or sealed in the meantime.

The break-off part is preferably integrally connected to the connection part in the initial state when the ampoule has not been opened. In this case, the break-off part preferably does not extend beyond the predetermined breaking point along the longitudinal extension direction and consequently does not protrude beyond the predetermined breaking point in the direction of the connection part. In particular, the break-off part preferably does not comprise any wings which extend laterally on the connection part parallel to the longitudinal extension direction and produce an additional connection between the break-off part and the connection part.

As a result of the break-off part being connected to the connection part only by means of one predetermined breaking point which preferably extends in a plane transversely to the longitudinal direction of the connection part, the break-off part is able to be detached in a simple manner from the connection part for opening the ampoule. Once the break-off part has been broken off, a defined interface with a clean separating edge is produced on the connection part onto which the suitable removal device is able to be fitted in a simple, sealing manner.

The ampoule body comprises an oval form in cross section transversely to the longitudinal direction. In this case, the ampoule body, in cross section transversely to the longitudinal extension direction, advantageously comprises a width which is smaller or equal to a depth of the ampoule body. The width, in this connection, is measured along a width direction between connecting webs which are arranged on both sides of the ampoule body for connection to other ampoules, whilst the depth is measured along a depth direction which extends transversely to the width direction. The ampoule body of the ampoule consequently comprises a greater depth than width, which can cause the ampoule body to be able to collapse in an advantageous manner and in particular additionally enables a reduction in the ampoule height. The ampoule has a deeper center of gravity and resulting from this good stability. In addition, the overall width is reduced in the case of ampoules that are connected together (so-called rack of ampoules).

On its side remote from the connection part, the ampoule body preferably comprises a bottom on which a standing surface is realized, onto which it is possible to place the ampoule. The bottom can be realized, in this connection, at least in regions in a flat manner in order to provide a standing surface in this way. It is also conceivable in this case for the bottom to arch into the interior such that on its transition into the lateral walls of the ampoule body, the bottom realizes a ring-shaped surface portion for providing a standing ring onto which the ampoule can be placed.

The connection part comprises an opening into which a syringe cone of a removal device is able to be inserted in a sealing manner. Together with its at least two threads arranged on the threaded portion, the connection part realizes, in this manner, a (female) Luer lock connection onto which a removal device, for example a syringe with a suitable counterpart, can be fitted, as a result of inserting a syringe cone of the removal device into the opening of the connection part and, as an option, as a result of screw-connecting a union nut, in particular a male Luer lock connection, of the removal device to the threaded portion of the connection part, a fixed connection can be created between the removal device and the connection part with a sealed transition between the connection part and the removal device.

The opening of the connection part is tapered, in this connection, preferably in a conical manner along the longitudinal extension direction and, in this case, is tapered into the connection part such that the syringe cone of the removal device is able to be inserted into the opening and, when it is inserted, abuts flatly against the cone-shaped inner wall of the opening. In particular, the cone-shaped inner wall of the opening forms a sealing face along the longitudinal axis (L) over a region of at least 0.5 mm and preferably of at least 1 mm. In one embodiment, said region is between 0.5 mm and 5 mm and preferably between 1 mm and 3 mm or 4 mm. A sealing face is produced as it were and not just a sealing lip.

In particular, with the removal device, for example a syringe, connected completely, the connected or here inserted cone of the removal device, for example the syringe cone, is situated exclusively in the connection part. It does not extend into the ampoule body. As a result, the remaining liquid can be reduced during removal and, where applicable, the liquid can even be removed substantially totally out of the ampoule.

In a further development, the ampoule can also comprise a coating which is to prevent or at least reduce permeation through the ampoule material. The coating serves, for example, for providing an oxygen barrier, an active substance barrier and/or a water vapor barrier. As a result, the ingress of oxygen, the loss of active substances and/or the loss of water vapor can be countered. Such a coating can be applied, in particular, onto an inside surface or an outside surface of the ampoule and can be produced, for example, by using materials such as metallocene, EVOH or an oxide material (e.g. SiOx).

In place of applying a coating onto the ampoule body, it is also possible to introduce or embed a suitable material, which is able to provide a desired barrier, in particular an oxygen barrier, already into the material of the ampoule body such that the ampoule, which is preferably produced by means of the blow/fill/seal method, itself comprises suitable barrier characteristics.

As an alternative to this, it is also possible to introduce an ampoule of the type described here into a, for example, oxygen-proof outer packaging such that at least one oxygen barrier is able to be provided by means of such an outer packaging.

In the case of an ampoule arrangement with several ampoules, the ampoules are preferably connected together integrally by means of connecting webs. In this connection, between every two ampoules there is situated a connecting web which extends axially between the ampoule bodies of the ampoules parallel to the longitudinal extension direction and produces an integral connection between the associated ampoules themselves. In this connection, further ampoules can be arranged on both sides of each ampoule such that two connecting webs can be arranged in a diametrically opposed manner on each ampoule, by means of which connecting webs further ampoules are able to be joined to the ampoule bodies of the ampoules on both sides of the ampoules.

Consequently, an integral connection between the ampoules is created by means of a connecting web which extends between two ampoules. In order to make it possible, in this connection, to detach the ampoules from one another in a simple manner, an incision can be provided on one or on both axial ends of the connecting web (at the top and/or bottom of the ampoule body), which incision extends in a tapered manner into the connecting web and makes it possible for the ampoules to be able to be separated from one another in an easy manner without much effort. As a result of suitably shaping the connecting web, on which, for example, a separating line is able to be provided as a result of a targeted reduction in the material strength along a line extending between the ampoule bodies, the ampoules are then able to be separated from one another in a simple, defined manner, defined separating surfaces then being produced on the ampoule bodies after separation.

The break-off parts of ampoules that are arranged side by side are preferably not connected together. Two ampoules that are arranged side by side are consequently connected together simply by means of the connecting web extending between the ampoule bodies, not by means of their break-off parts. The break-off parts are consequently provided separated from one another. This results in the ampoules being able to be separated from one another in a simple manner without much effort without any risk of a break-off part being broken off an ampoule—unintentionally—during separation.

In the case of a combination between an ampoule according to the type described above and a removal device, a syringe cone, which is arranged on a syringe body of the removal device, is insertable in a positive locking manner into an opening of a connection part of the ampoule such that, in the inserted state, the syringe cone rests in a positive locking manner in the opening and additionally a screw-connected connection to the threaded portion of the connection part can be produced by means of a union nut of the removal device.

An ampoule of this type serves, for example, for preserving a medical substance, in particular a drug or another liquid, preferably an infusion solution which is used for medical purposes, for example magnesium, calcium chloride, potassium chloride, sodium chloride, glucose, sterile water, nutrients for parenteral nutrition or the like.

The concept underlying the invention is to be explained in more detail below by way of the exemplary embodiments shown in the figures, in which.

FIG. 1 and FIG. 2A, 2B, 2C show an ampoule arrangement which comprises a plurality of ampoules 1 (five ampoules 1 in the exemplary embodiment shown) and as such can be delivered or kept in a suitable packaging. The ampoules 1 serve for receiving medical liquid in an ampoule body 11 and are connected together integrally by means of connecting webs 14 such that an integral unit is created.

Each ampoule 1 comprises an ampoule body 11 and a connection part 12 arranged thereon. With the ampoule 1 not opened, a break-off part 13, which seals an access to the ampoule body 11 in the form of an opening 125 (for example see FIG. 7), is integrally connected to the connection part 12 and, with the ampoule 1 closed, also seals the ampoule body 11 toward the outside. The break-off part 13 is connected to the connection part 12 by means of a predetermined breaking point 15 and can be broken off or twisted off from the connection part 12 for opening the ampoule 1. Consequently, the break-off part 13 can also be designated as a twist-off part.

The connection part 12 extends from the ampoule body 11 in a substantially cylindrical manner along a longitudinal extension direction L. The connection part 12 connects to the ampoule body 11 by way of a neck portion 124 (for example see FIG. 2B), then merges into a neck portion 123 which has a slightly reduced diameter compared to the neck portion 124 and to which connects, in turn, a threaded portion 122 with thread portions 120A, 120B, 121A, 121B arranged thereon. The break-off part 13 is integrally connected to the threaded portion 122 by means of the predetermined breaking point 15 which extends around the longitudinal extension direction L.

The connection part 12 is preferably measured along the longitudinal axis Z in such a manner that the end face of a syringe cone 21, in particular according to the Luer standard, with the syringe 2 in the completely connected state, extends up to a maximum of approximately the height of the neck portion 124 of the connection part 12. With the syringe 2 in the completely connected state, the syringe cone 21 is consequently only situated in the connection part 12. It does not extend into the ampoule body 11. The thread portions 120A, 120B, 121A, 121B realize two threads on the threaded portion 122. Each thread, in this connection, is created by two thread portions 120A, 121B or 120B, 121A, the threads being offset axially with respect to one another. Thus, the thread portion 120A is axially offset to the thread portion 121A, whilst the thread portion 120B is axially offset to the thread portion 121B. The thread portions 120A, 121B or 120B, 121A, which in each case form one thread, are arranged on diametrically opposite sides of the thread portion 122, the thread portions 120A, 121B or 120B, 121A continuing one another and as a result creating a functionally continuous thread, onto which an associated union nut with a corresponding thread is able to be screw-connected.

As a result of two threads 120A, 121B and 120B, 121A being provided on the threaded portion 122, a removal device 2, for example in the form of a syringe, can be screw-connected in a defined manner onto the threaded portion 122 of the connection part 12 by way of a union nut 20 such that a defined connection is able to be produced between the removal device 2 and the connection part 12.

Figure 6A:
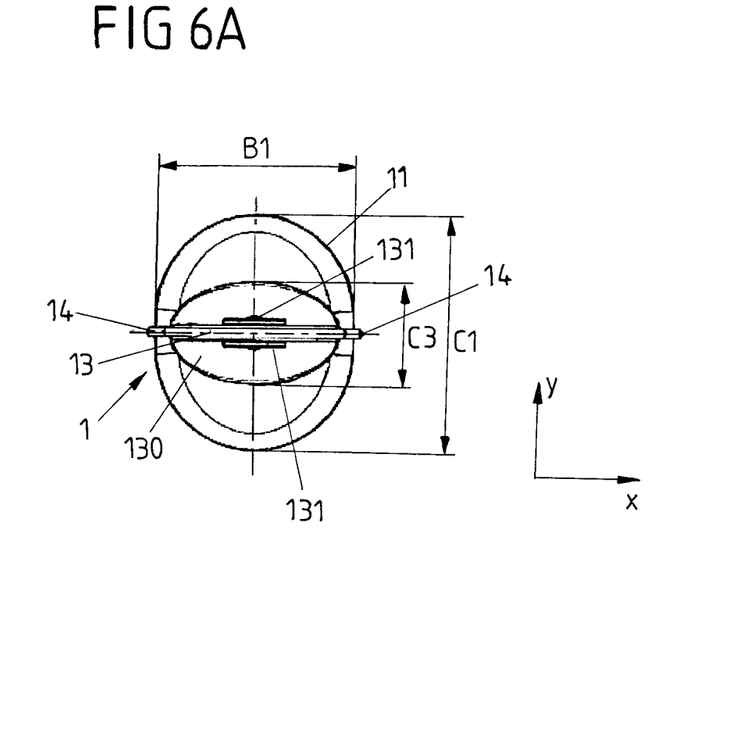
FIG. 6A shows a top view of the ampoule.
Figure 6B:
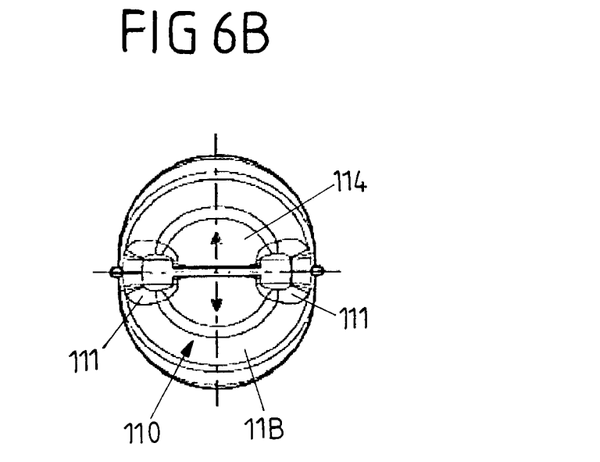
FIG. 6B shows a view of the ampoule from below.

Each ampoule 1 comprises a bottom 110 which is realized at least in portions in a flat manner such that a standing surface is provided, onto which each ampoule individually or the ampoule arrangement 10 as a whole is able to be placed such that the ampoule 1 or the ampoule arrangement 10 has a comparatively high level of stability. As can be seen from the bottom view of an individual ampoule 1 according to FIG. 6B, recesses 111, which interrupt a standing ring 113 that realizes a standing surface, are realized on the bottom 110. The standing ring 113 surrounds an indentation 114 by way of which the bottom 110 is arched into the interior of the ampoule body 11.

The break-off part 13 forms a cap element which seals the closure part 12. The break-off part 13, in this case, comprises a grip defining means 130 (see FIG. 2B) which is to prevent the fingers of a user, with which the break-off part 13 is gripped for breaking it off, being able to slip toward the connection part 12. In this way, the user is prevented from being able to come into contact with the connection part 12 when breaking off the break-off part such that contamination that impairs the sterility of the connection part 12 is avoided.

An identification 131 in the form of an embossing, which protrudes in a raised manner from the break-off part 13 and comprises the form of an arrow, is further provided on the break-off part 13. The identification can serve, for example, as an originality symbol in order to indicate that the break-off part 13 is an original part.

The break-off part 13 further comprises a display surface 132 which can serve for labeling the ampoule 1 in order to specify, for example, a lot number. A display surface 112 on which, for example, details regarding the medical liquid contained in the ampoules 1, for example name, intended purpose, dosage or the like, can be specified, is provided on the ampoule body 11.

The ampoule arrangement 10 is produced in one piece, the individual ampoules 1 being formed and filled in one common forming mold by means of the blow/fill/seal method. The ampoule arrangement 10 is consequently produced in a standard production process, the ampoule arrangement 10 being produced as the process outcome thereof.

The ampoules 1 can be produced, for example, from polypropylene (PP) or polyethylene (PE). However, other plastics materials which are suitable for producing a plastic ampoule for preserving medical liquids are in principle also conceivable.

In order to administer a liquid contained in an ampoule 1 within the framework of an infusion or injection or for the enteral nutrition of a patient, one ampoule 1 has to be separated from the other ampoules 1 of the ampoule arrangement 10 and then the break-off part 13 has to be detached from the connection part 12 of the ampoule 1. The separating of an ampoule 1 from the remaining ampoules 1 of the ampoule arrangement 10 is effected, in this connection, as a result of the ampoule being separated from the adjacent ampoule 1 along the connecting web 14, by means of which the ampoule 1 is connected to an adjacent ampoule 1, V-shaped incisions 140, 141, which simplify separating the ampoules 1 from one another and in particular enable the connecting web 14 to be torn in a simple manner, are provided for this purpose on the axial ends of the connecting web.

The ampoules 1 of the ampoule arrangement 10 are connected together exclusively by means of the connecting webs 14 between the ampoule bodies 11. The break-off parts 13 of the individual ampoules 1, in contrast, are not connected (directly) to one another. To detach one ampoule 1 from an adjacent ampoule 1, consequently just the connecting web 14 between the ampoule bodies 11 has to be separated. As a result of the break-off parts 13 of the ampoules 1 not having to be detached from one another, there is no risk of a break-off piece 13 being unintentionally broken off from the associated connection part 12 when separating the ampoules 1.

Figure 7:
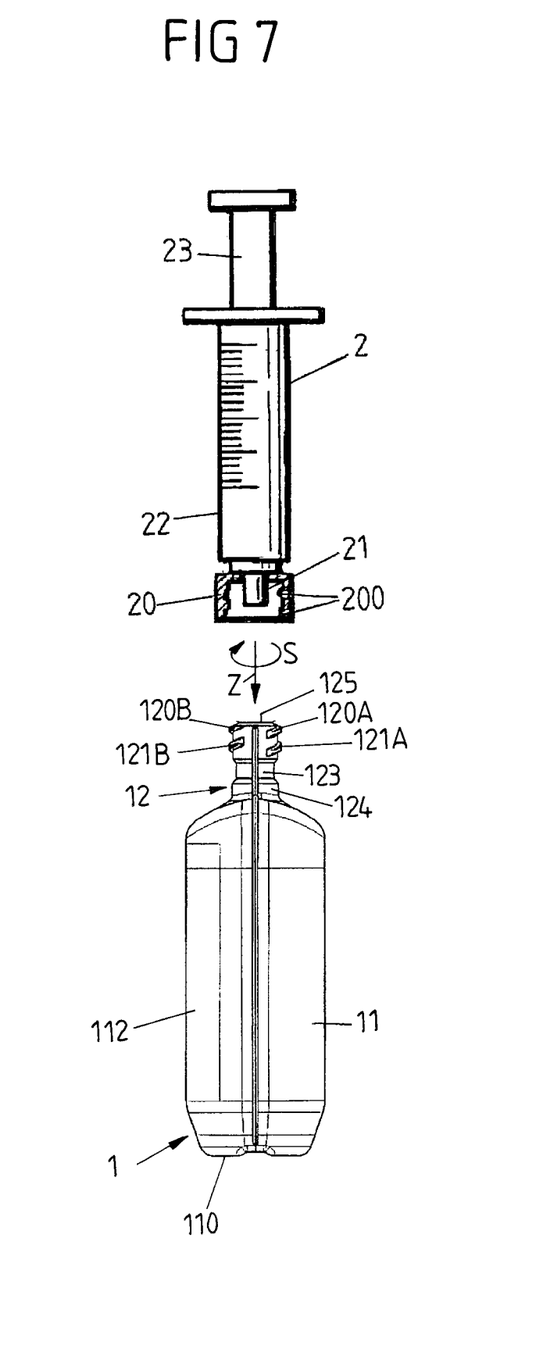
FIG. 7 shows a view of the ampoule with the break-off part broken off prior to the fitting of a removal device in the form of syringe.

To remove the medical liquid out of the ampoule body 11, the break-off piece 13, as shown in FIG. 7, is then removed from the connection part 12 such that the opening 125 of the connection part 12 is exposed. A removal device 12, for example in the form of a syringe, can then be inserted with a conical syringe cone 21 into the opening 125, the opening 125 being conical in a corresponding manner and tapering in a fitting direction Z such that the syringe cone 21, when being fitted in the fitting direction Z, moves to abut in a positive locking manner against the inner wall of the opening 125. The connection between the removal device 2 and the ampoule 1 can then be secured as a result of screw-connecting a union nut 20 in a screw direction S onto the threaded portion 122 of the connection part 12 such that, with the removal device 2 fitted, as a result of raising the plunger 23 the medical liquid is able to be sucked into a syringe body of the removal device 2. The length of the connection part 12 is preferably chosen such that the syringe cone 21, with the syringe 2 fully inserted, is still situated inside the connection part 12. The syringe cone 21, in this case, does not extend into the ampoule body 11. The end face of the syringe cone 21 is still situated inside the neck portion 123 and/or 124.

As a result, the residual quantity remaining in the ampoule 1 as the liquid is removed is able to be reduced. For example, a length of the connection part 12 is between 0.5 cm and 2 cm and is preferably between 0.8 cm and 1.5 cm.

FIG. 3A, 3B to 6A, 6B show views of one individual ampoule 1. As can be seen, for example, from the top view according to FIG. 6A, the ampoule body 11 comprises an oval basic form in cross section transversely to the longitudinal extension direction L of the connection part 12, where the width B1 is smaller in a width direction X than a depth C1 in a depth direction Y. The width B1, in this connection, is measured between connecting webs 14 which extend at the side of the ampoule body 11, are situated diametrically opposite the longitudinal extension direction L and by means of which the ampoule 1 is able to be connected to further ampoules 1.

In dependence on the number of ampoules 1, the ampoule arrangement 10 can comprise, for example, a total width B (see FIG. 2A) of between 80 mm and 120 mm and is preferably approximately 100 mm. The width B1 of the ampoule body 11, for example, can be between 15 mm and 25 mm and is preferably approximately 18 mm. The width B2 of the break-off part 13 can be between 10 mm and 20 mm and is preferably approximately 16 mm. The break-off part 13 is narrower than the ampoule body 11.

The height H of the ampoule 1 and consequently of the ampoule arrangement 10 overall (see FIG. 2A) can be, for example, between 70 mm and 100 mm and is preferably approximately 85 mm. The height H1 of the ampoule body 11 with the connection part 12 connected thereto, in this case, can be between 50 mm and 75 mm and is preferably approximately 62 mm. The height H2 of the break-off part 13 can be between 15 mm and 30 mm and is preferably approximately 22 mm. The display surface 132 of the break-off part 13 can comprise, for example, a height H3 of between 5 mm and 15 mm and is preferably approximately 10 mm. The display surface 112 of the ampoule body 11 can comprise, for example, a height H4 of between 20 mm and 50 mm and is preferably approximately 37 mm.

Figure 1:
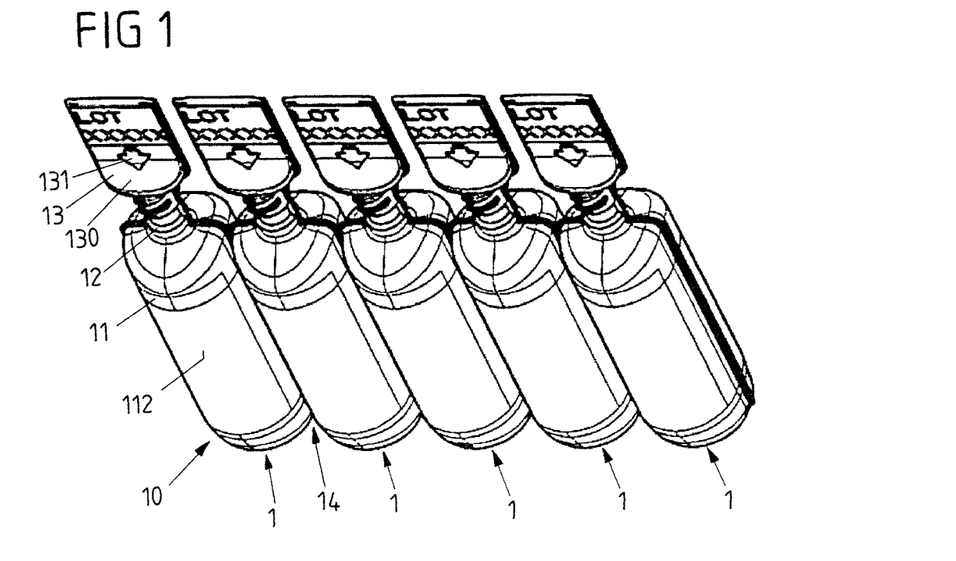
FIG. 1 shows a perspective view of an ampoule arrangement with several ampoules connected together.
Figure 2A:
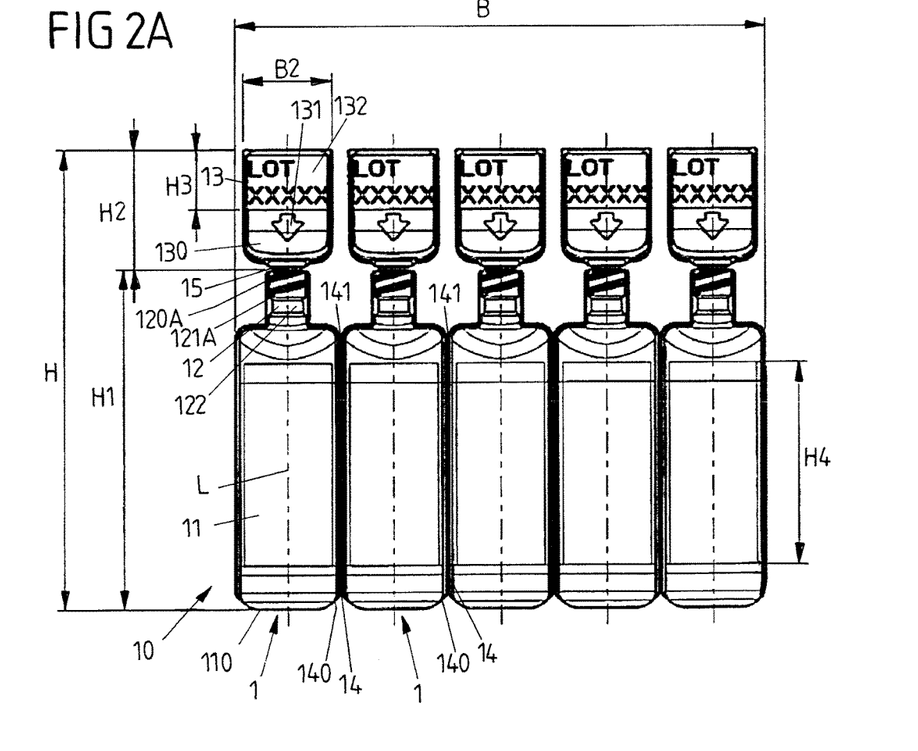
FIG. 2A shows a front view of the arrangement according to FIG. 1.
Figure 2B:
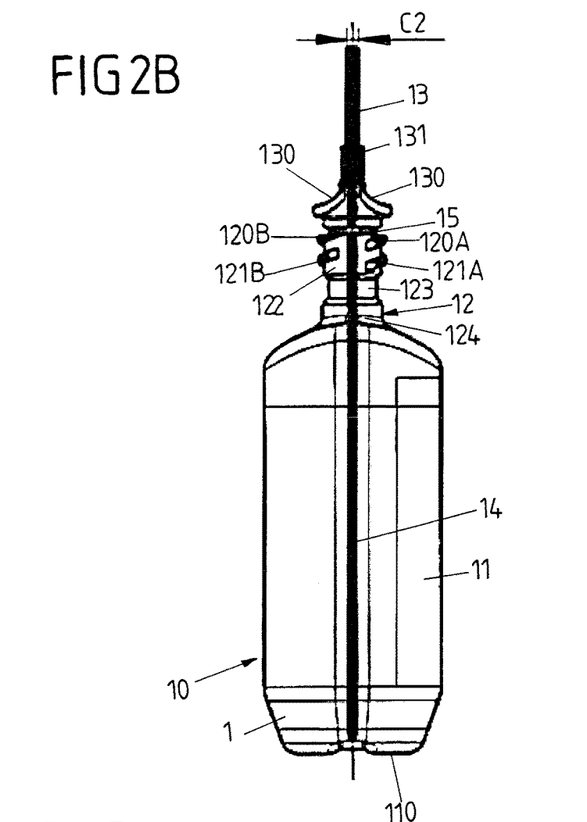
FIG. 2B shows a side view of the arrangement according to FIG. 1.
Figure 2C:
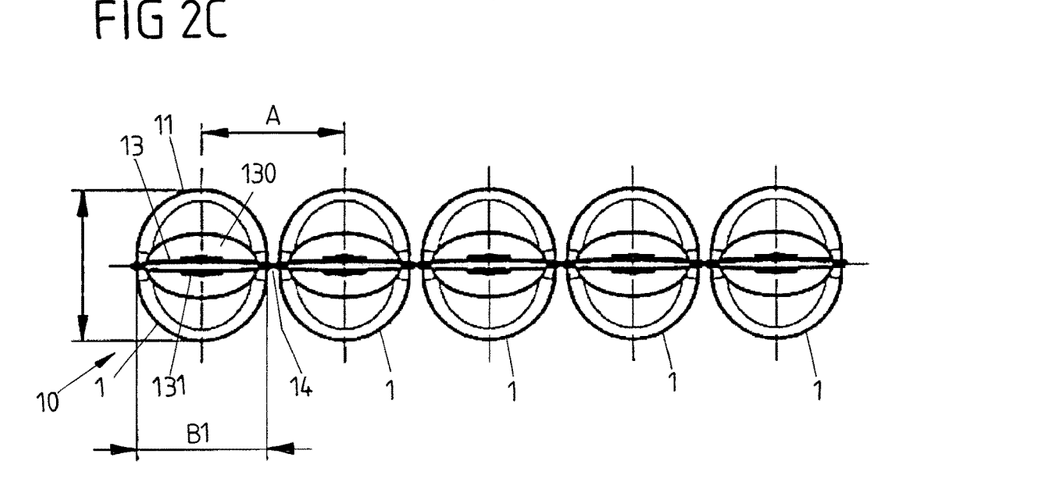
FIG. 2C shows a top view of the arrangement according to FIG. 1.
Figure 3A:
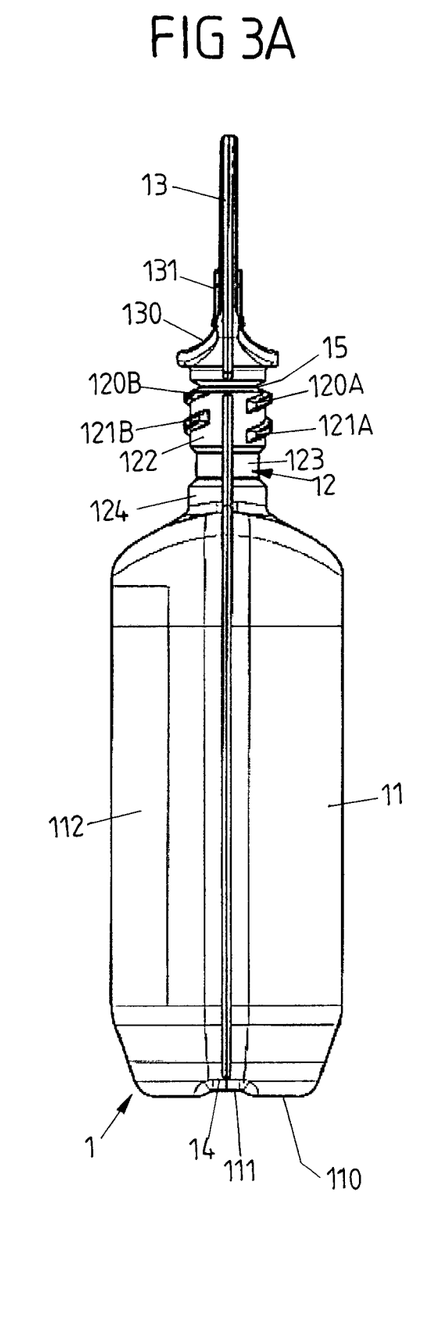
FIG. 3A shows a side view of an ampoule.
Figure 3B:
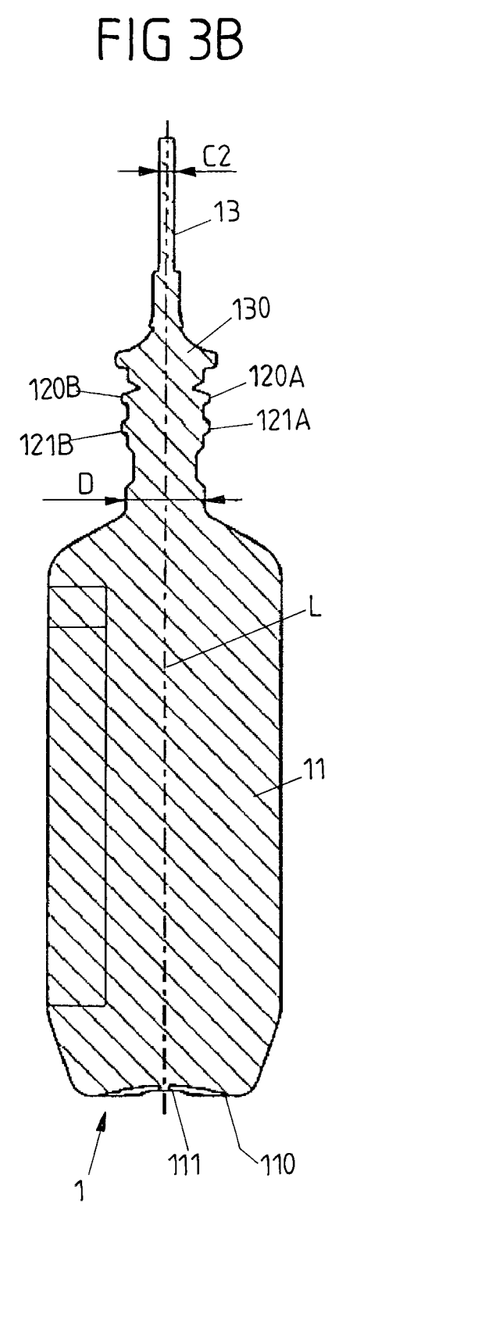
FIG. 3B shows a projection view of the ampoule according to FIG. 3A.
Figure 4:
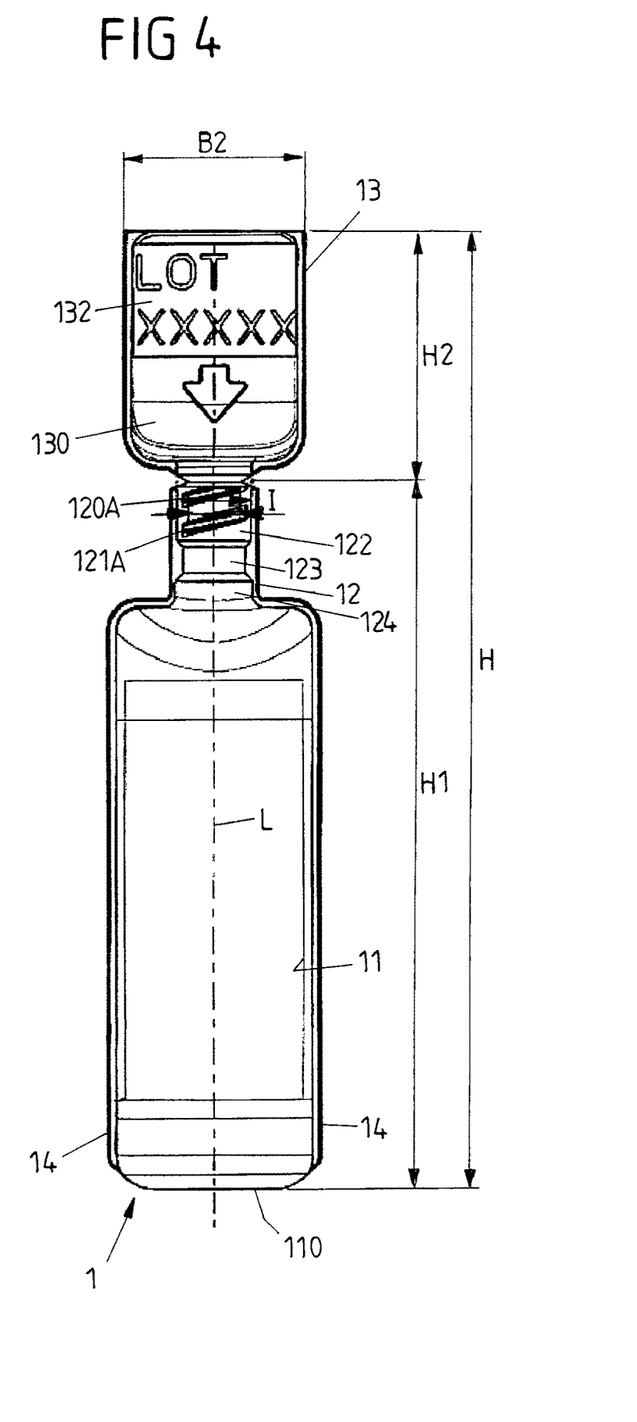
FIG. 4 shows a different side view of the ampoule.
Figure 5:
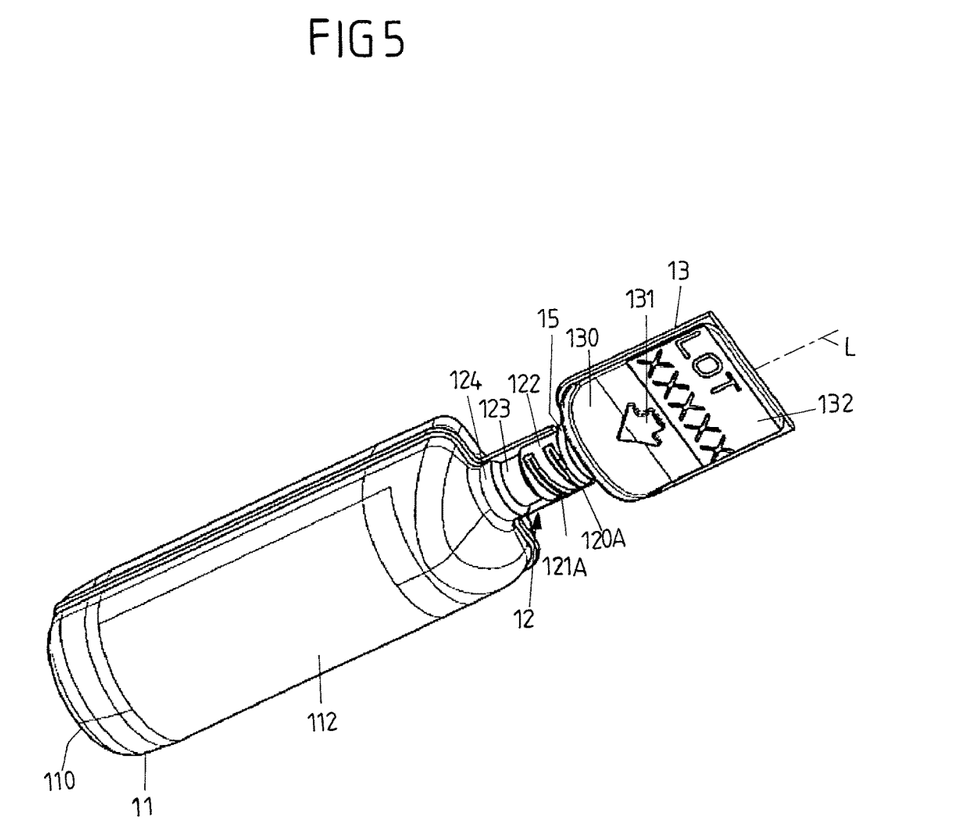
FIG. 5 shows a perspective view of the ampoule.

The depth C1 of the ampoule body 11 and consequently of the ampoule arrangement 10 overall can comprise, for example, between 15 mm and 25 mm and is preferably approximately 21 mm (for example see FIG. 2C). The distance A between two ampoules can comprise, for example, between 15 mm and 25 mm and is preferably approximately 19 mm. The width B1 of the ampoule body 11 can be, for example, between 15 mm and 25 mm and is preferably approximately 18 mm.

The depth C2 of the break-off piece 13 can be, for example, between 1 mm and 2 mm and is preferably approximately 1.5 mm (see FIG. 2B).

The neck portion 124 connecting to the ampoule body 11 can comprise, for example, a diameter D of between 5 mm and 10 mm and is preferably approximately 7 mm. The inner cone of the opening 125 is tapered from a diameter I of between 6 mm and 7.5 mm and preferably approximately 6.7 mm, to a diameter I of between 4 mm and 5.5 mm and preferably approximately 4.7 mm, into the interior of the connection part 12 (see FIG. 3B and FIG. 4).

The grip defining means 130 of the break-off part 13 can comprise, for example, a depth C3 (see FIG. 6A) of between 3 mm and 9 mm and is preferably approximately 6 mm.

The dimensions named above are simply to be understood as an example and can be suitable, for example, for an ampoule 1 with a holding capacity of 10 ml. In the case of a different holding capacity of, for example, 5 ml, 20 ml or 30 ml, other dimensions can be produced, in particular the measurements of the ampoule body 11 scaling and the dimensions of the connection part 12 and of the break-off part 13, however, being substantially maintained.

With different holding capacities, the ampoules 1, in this case, can scale in such a manner that they comprise a substantially identical overall height H, a scaling is consequently effected in the width B1 and the depth C1 of the ampoule body 11, not however, or at least only insignificantly, in the height H1 of the ampoule body 11.

Figure 8:
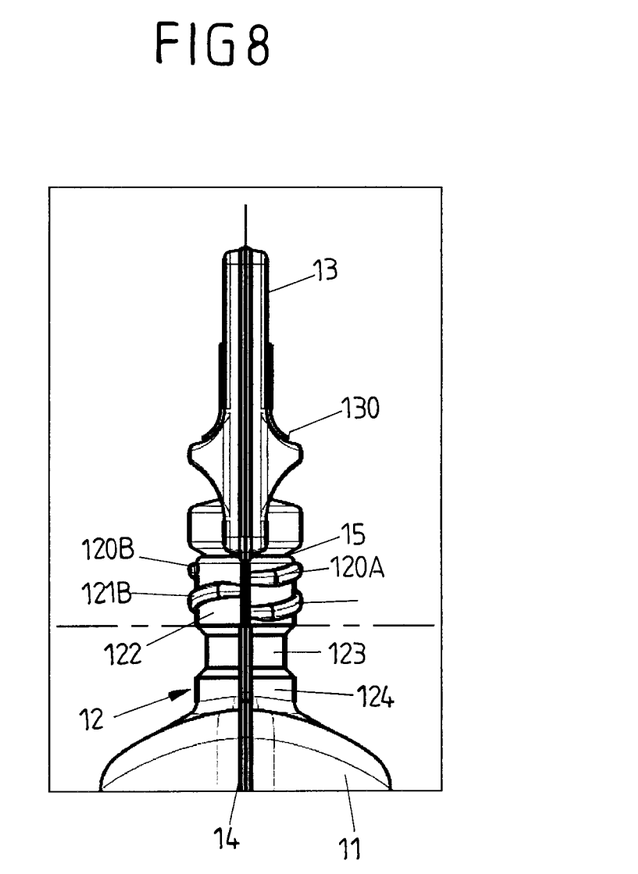
FIG. 8 shows a view of a different exemplary embodiment of a connection part of an ampoule.

FIG. 8 shows a cutout of a different exemplary embodiment of an ampoule 1 with a connection part 12 which is modified in relation to the exemplary embodiment according to FIGS. 1 to 7, where the threads formed by the thread portions 120A, 121B or 120B, 121A comprise a slightly different form. In particular, the thread portions 120A, 120B, 121A, 121B are curved at their ends. This enables a comparatively large thread with, at the same time, good demoldability from a production mold.

The concept underlying the invention is not restricted to the exemplary embodiments depicted previously, but can also be realized in the case of completely different embodiments.

In particular, the ampoules of an ampoule arrangement can, in principle, comprises totally different measurements to those specified here. All the dimensions included here are simply to be understood as an example.

In principle, it is also conceivable to provide more than two threads on a connection part, the threads not necessarily having to be formed from several thread portions.

It is also possible to connect together more or fewer than five ampoules within the framework of one ampoule arrangement.

LIST OF REFERENCES

1 Ampoule
10 Ampoule arrangement
11 Ampoule body
110 Bottom
111 Recess
112 Display surface
113 Standing ring
114 Indentation
12 Connection part
120A, 120B, 121A, 121B Thread portion
122 Threaded portion 123, 124 Neck portion
125 Opening
13 Break-off part
130 Grip defining means
131 Identification
132 Display surface
14 Connecting web
140, 141 Incision
15 Predetermined breaking point or ring predetermined breaking point
2 Removal device (syringe)
20 Union nut
200 Thread grooves
21 Syringe cone
22 Syringe body
23 Punch
A Distance
B, B1, B2 Width
C1, C2 Depth
D Diameter
H, H1-H4 Height
L Longitudinal extension direction
I Inside diameter
S Screw direction
X Width direction
Y Depth direction
Z Fitting direction

The invention claimed is:

1. A combination comprising:
an ampoule produced by blowing, filling, and sealing, wherein the ampoule includes an ampoule body, a connection part, and a break-off part, the break-off part being integral with the connection part, wherein there exists a predetermined breaking point to mark where the break-off part is to be broken off from the connection part, the connection part extending along a longitudinal direction and being integral with the ampoule body, wherein an outer face of the connection part forms a threaded portion that comprises first and second threads arranged thereon, the first and second threads being offset axially relative to each other along the longitudinal direction; and
a removal device including an injection body and a Luer cone arranged on said injection body, wherein the connection part of the ampoule including an inner wall that defines an opening for receiving said Luer cone, wherein, after the opening has received the Luer cone, the removal device becomes completely connected, wherein, when the removal device is completely connected, a sealing face that extends along the longitudinal direction by at least a millimeter along the inner wall forms a seal between the Luer cone and the inner wall, and wherein, when the removal device is completely connected, the Luer cone is disposed within the connection part but does not enter the ampoule body.

2. The combination of claim 1, wherein each of said first and second threads comprises two thread portions that are arranged on diametrically opposite sides of the threaded portion.

3. The combination of claim 1, wherein a ring predetermined breaking point which extends over a circumference of an opening in the connection part defines said predetermined breaking-point.

4. The combination of claim 1, wherein the break-off part comprises an identification in the form of an opening.

5. The combination of claim 1, wherein when viewed along the longitudinal direction, the break-off part does not protrude beyond the predetermined breaking-point in the direction of the connection part.

6. The combination of claim 1, wherein the ampoule body has an oval cross section transverse to the longitudinal direction.

7. The combination of claim 6, wherein connecting webs are arranged on both sides of said ampoule body, wherein said connecting webs connect said ampoule to other ampoules, wherein said connecting webs defines a connecting-web direction, wherein there exists a depth direction that is transverse to said connecting-web direction, wherein said oval cross section has a width that extends along said connecting-web direction, wherein said width is less than or equal to a depth of the ampoule body that is measured along said depth direction.

8. The combination of claim 1, wherein, on a side that is remote from the connection part, the ampoule body comprises a bottom that defines a standing area to enable said ampoule to be stood up.

9. The combination of claim 1, wherein the inner wall that defines said opening is tapered conically along the longitudinal direction.

10. The combination of claim 1, wherein said ampoule is one of a plurality of identical ampoules, adjacent ones of which are connected by a connecting web.

11. The combination of claim 10, wherein the connecting web extends along an axis that is parallel to the longitudinal direction and wherein an incision that points axially into the connecting web is arranged on at least one axial end of the connecting web.

12. The combination of claim 10, wherein the break-off parts of the ampoules are arranged side-by-side, are connected together by means of the connecting web, and are not connected to one another.

13. The combination of claim 1, wherein the break-off part comprises an identification in the form of an embossing.

* * * * *